(12) United States Patent
Quaggiotto et al.

(10) Patent No.: US 10,066,693 B2
(45) Date of Patent: Sep. 4, 2018

(54) MOUNTING ASSEMBLY

(71) Applicant: GM GLOBAL TECHNOLOGY OPERATIONS LLC, Detroit, MI (US)

(72) Inventors: Michael T. Quaggiotto, Windsor (CA); Timothy P. Filippi, Macomb, MI (US); Kevin P. Barbash, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 197 days.

(21) Appl. No.: 15/210,021

(22) Filed: Jul. 14, 2016

(65) Prior Publication Data

US 2018/0017124 A1    Jan. 18, 2018

(51) Int. Cl.
| | | |
|---|---|---|
| *F16F 1/377* | (2006.01) | |
| *F16F 1/54* | (2006.01) | |
| *F16M 13/02* | (2006.01) | |
| *B60K 15/07* | (2006.01) | |
| *B60G 5/02* | (2006.01) | |

(52) U.S. Cl.
CPC ............... *F16F 1/377* (2013.01); *F16F 1/54* (2013.01); *F16M 13/02* (2013.01); *B60G 5/02* (2013.01); *B60K 15/07* (2013.01)

(58) Field of Classification Search
CPC .. F16F 1/377; F16F 1/54; B60K 15/07; B60G 5/02; F16M 13/02
See application file for complete search history.

(56) References Cited

U.S. PATENT DOCUMENTS

| | | | | |
|---|---|---|---|---|
| 2013/0025954 A1* | 1/2013 | Miller | ............... | B62D 25/10 180/69.21 |
| 2014/0246558 A1* | 9/2014 | Ichikawa | ............ | F16F 13/1409 248/634 |
| 2014/0252189 A1* | 9/2014 | Kifer | ............... | F16M 11/10 248/299.1 |
| 2014/0327285 A1* | 11/2014 | Brines | ............... | A47C 1/024 297/354.1 |
| 2016/0167598 A1* | 6/2016 | Martin | ............ | B60R 13/105 248/476 |
| 2018/0017124 A1* | 1/2018 | Quaggiotto | ............ | F16F 1/377 |
| 2018/0065823 A1* | 3/2018 | Edmonds | ............ | B65H 16/005 |

FOREIGN PATENT DOCUMENTS

| | | | | |
|---|---|---|---|---|
| CA | 2572261 A1 * | 2/2006 | ............... | F16F 1/54 |
| DE | 102017115066 A1 * | 1/2018 | ............ | F16F 1/377 |
| EP | 3127733 A1 * | 2/2017 | ........... | B60K 5/1216 |

* cited by examiner

*Primary Examiner* — Karen Beck
(74) *Attorney, Agent, or Firm* — Quinn IP Law

(57) ABSTRACT

A mounting assembly is provided. The mounting assembly includes a first assembly portion coupled to a first component and a second assembly portion coupled to a second component. The first assembly portion includes a first bracket and a locating pin. The first bracket has a first surface, a second surface, and defines a first bracket protrusion having a first bracket bore therein. The locating pin has a first end, a second end, and an exterior surface. The first end of the locating pin is fixedly mounted within the first bracket bore. The second assembly portion includes a base plate that has a base plate first surface and a base plate second surface and defines a base plate protrusion portion having a protrusion bore therein. The locating pin is configured to be inserted into the protrusion bore in order to position the first component with respect to the second component.

19 Claims, 3 Drawing Sheets

MOUNTING ASSEMBLY

TECHNICAL FIELD

The disclosure relates to mounting assemblies. More particularly, the disclosure relates to mounting assemblies for mounting a vehicle powertrain to a vehicle frame.

BACKGROUND

Mounting assemblies can be utilized in a variety of applications in order to couple one component to another. Specifically, a mounting assembly is useful in vehicular applications, namely in mounting a vehicle powertrain to a vehicle frame or powertrain cradle. In addition to providing satisfactory support and restraint of the engine, mounting assemblies for a vehicle engine may be designed to provide ease of installation of the engine on the vehicle frame during assembly.

SUMMARY

A mounting assembly configured to couple a first component and a second component is provided. The mounting assembly may be used in vehicular applications, for example, to couple a vehicle frame and vehicle powertrain. The mounting assembly includes a first assembly portion and a second assembly portion.

The first assembly portion is coupled to the first component. The first assembly portion includes a first bracket and a locating pin. The first bracket is secured to the first component and has a first bracket first surface and a first bracket second surface. The first bracket defines a first bracket protrusion section that extends outwardly from the first bracket second surface. The first bracket protrusion section defines a first bracket bore therein at its tip end. The locating pin has a first end, a second end, and an exterior surface. The first end of the locating pin is fixedly mounted within the first bracket bore.

The second assembly portion is coupled to the second component. The second assembly portion includes a base plate. The base plate has a base plate first surface and a base plate second surface and defines a base plate protrusion portion that extends outwardly from the base plate second surface. The base plate protrusion portion defines a protrusion bore at its tip end.

When the first assembly portion is coupled to the second assembly portion, during assembly, the locating pin is inserted into the protrusion bore in order to position the second assembly portion and second component with respect to the first assembly portion and first component. Once the first assembly portion is coupled to the second assembly portion, the locating pin is disposed within the protrusion bore and the first bracket second surface is in contact with the base plate first surface, such that the locating pin maintains the alignment of the second assembly portion and the second component with respect to the first assembly portion and the first component.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

Referring generally to FIGS. 1-6, a mounting assembly 10 is provided. The mounting assembly 10 is configured to couple a first component 12 and a second component 14. The mounting assembly 10 may be utilized in a variety of practical applications such as vehicular applications, including but not limited to, automobiles, ships, airplanes etc. The mounting assembly 10 may be further useful in industrial equipment applications, playground equipment applications, farming equipment applications, and manufacturing and assembly applications, among others. When utilized in vehicular applications, such as the assembly and manufacture of an automobile, to couple the first component 12 and the second component 14, the first component 12 may be defined as a vehicle frame and the second component 14 may be defined as a vehicle powertrain.

Figure 1:
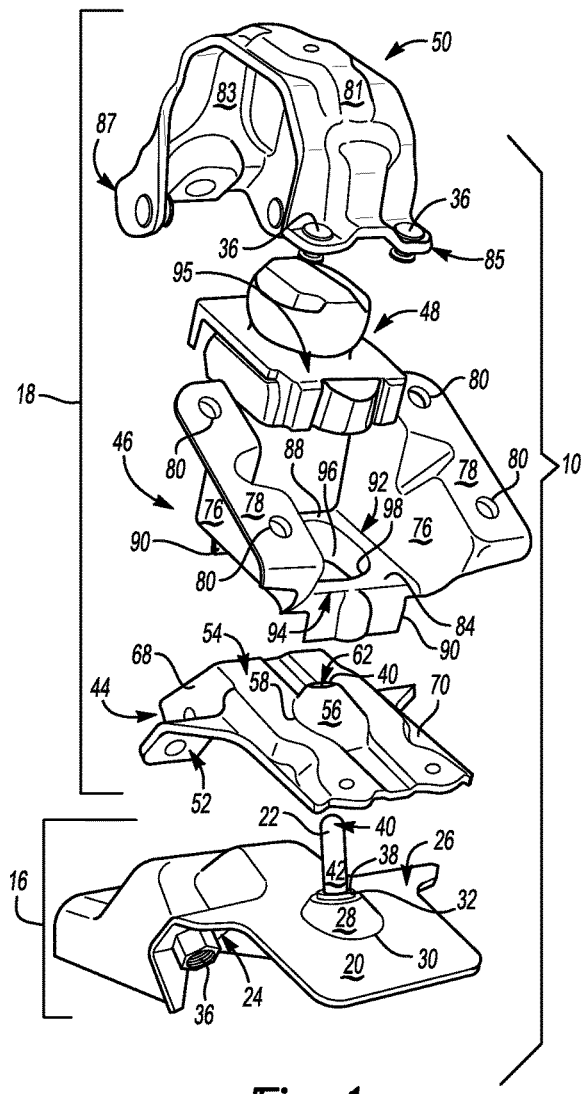
FIG. 1 is a first schematic, exploded, perspective view of an example mounting assembly.
Figure 2:
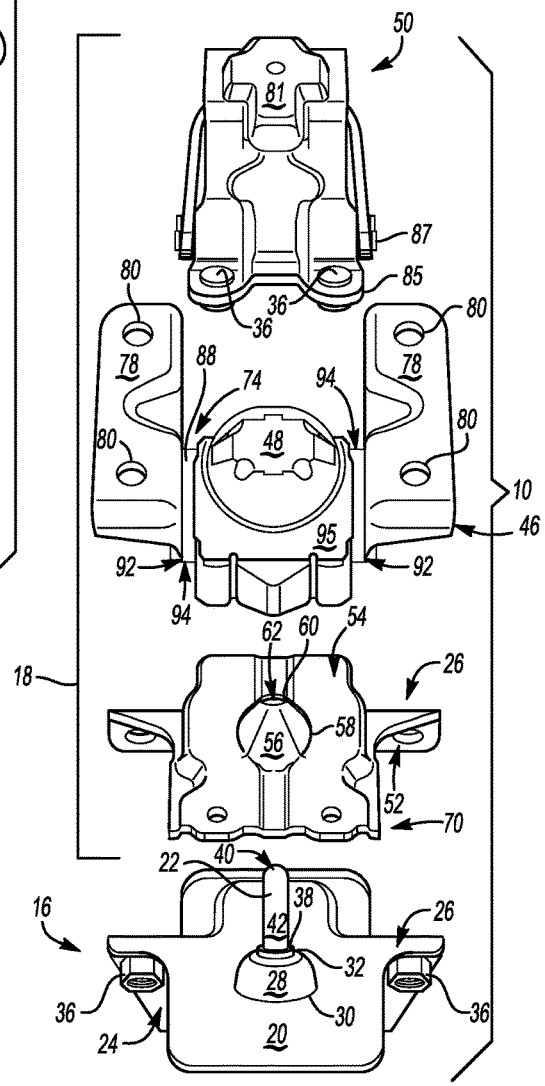
FIG. 2 is a second schematic, exploded, perspective view of the example mounting assembly.
Figure 3:
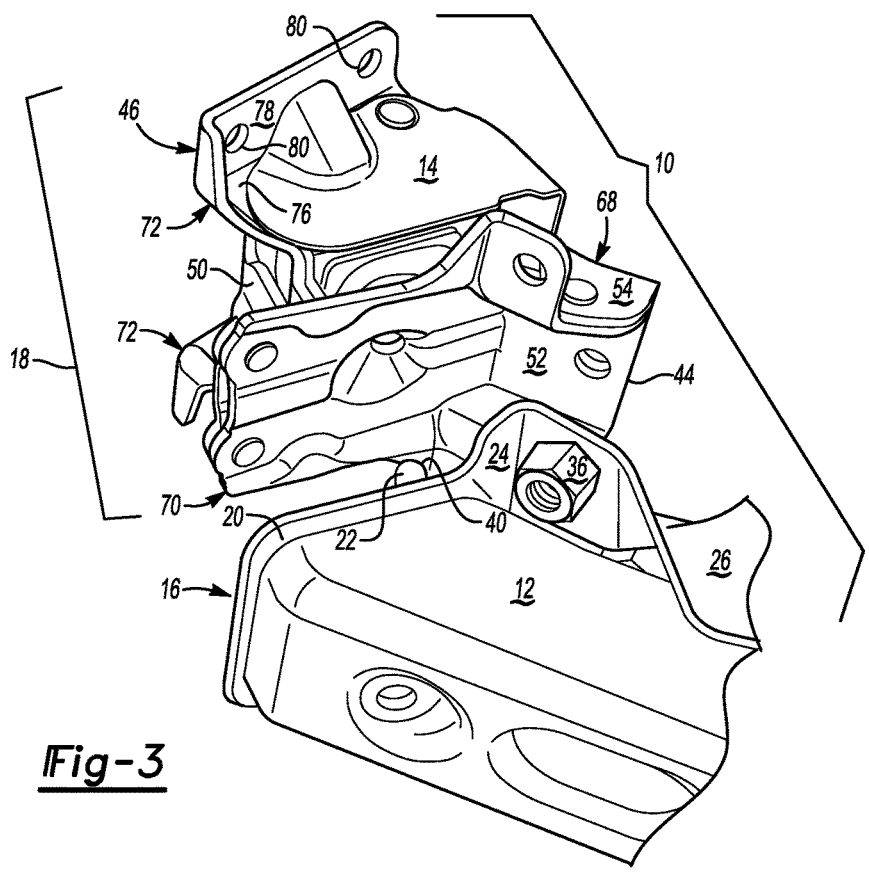
FIG. 3 is a third schematic, partially-exploded, perspective view of the example mounting assembly.

Referring to FIGS. 1-3, the mounting assembly 10 includes at least a first assembly portion 16 and a second assembly portion 18. The first assembly portion 16 may be paired with and/or coupled to the first component 12. The second assembly portion 18 may be paired with and/or coupled to the second component 14. Together the first assembly portion 16 and the second assembly portion 18 may operatively to couple the first component 12 and the second component 14 and position the second component 14 with respect to the first component 12.

The first assembly portion 16 may include a first bracket 20 and a locating pin 22. The first bracket 20 may be a stamped component formed of steel or the like. The first bracket 20 has a first bracket first surface 24 and a first bracket second surface 26. The first bracket 20 may further define a first bracket protrusion section 28 that extends outwardly from the first bracket second surface 26. The first bracket protrusion section 28 may have a base end 30 and a tip end 32, such that the first bracket protrusion section 28 tapers from base end 30 to tip end 32. The first bracket protrusion section 28 further defines a first bracket bore 34 therein, such that the first bracket bore 34 is positioned at the tip end 32 of the first bracket protrusion section 28. The first bracket 20 may be secured to the first component 12 via a plurality of fasteners 36, such that the first bracket first surface 24 is in contact with the first component 12.

The locating pin 22 has a first end 38, a second end 40, and a locating pin exterior surface 42. The locating pin 22 may be formed of a rigid material, including but not limited to, a metallic material, a rigid elastomer, or the like. The locating pin 22 may also be configured as an interior structural pin of a rigid material encapsulated in a rigid elastomer. The locating pin 22 is configured to be received by the first bracket 20, such that the first end 38 is fixedly mounted within the first bracket bore 34 and the remainder of the locating pin 22 extends outwardly from the first bracket protrusion section 28 such that the second end 40 is positioned on the first bracket second surface 26 side of the first bracket 20.

The second assembly portion 18 may include a base plate 44, a second bracket 46, a bushing 48, and a bracket strap 50. The base plate 44 may be a stamped component formed of a metallic material, such as steel or the like. The base plate 44 has a base plate first surface 52 and a base plate second surface 54. The base plate 44 includes a first portion 68 and a second portion 70. The base plate 44 second portion 70 defines a base plate protrusion portion 56 that extends outwardly from the base plate second surface 54. The base plate protrusion portion 56 is positioned substantially in the center of the second portion 70. The base plate protrusion portion 56 may have a base end 58 and a tip end 60, such that the tip end 60 is disposed on the base plate second surface 54. The base plate protrusion portion 56 may be conically shaped such that the protrusion portion 56 tapers from base end 58 to tip end 60. The protrusion portion 56 further defines a protrusion bore 62 therein at the tip end 60 thereof. The base plate protrusion portion 56 is configured to receive the first bracket protrusion 28, such that the locating pin 22 is disposed within the protrusion bore 62 near its first end 38 and the first bracket second surface 26 is in contact with the base plate first surface 52 when the first component 12 is coupled to the second component 14.

The second assembly portion 18 further includes the second bracket 46. The second bracket 46 may be a may be a stamped component formed of a metallic material, such as steel or the like. The second bracket 46 has a plurality of outer portions 72 and an intermediate portion 74 disposed between the outer portions 72. The outer portions 72 may be opposing outer portions 72 positioned opposite each other with the intermediate portion 74 disposed therebetween. Each outer portion 72 may include a wall portion 76 and a flange portion 78. The flange portion 78 may define a plurality of apertures 80 therein, each of which are configured to receive one of the plurality of fasteners 36.

The intermediate portion 74 may have a central portion 88 positioned between the outer portions 72. The intermediate portion 74 may have a first set of edges 92 and a second set of edges 94, such that one of the respective edges of the first set of edges 92 is positioned between the central portion 88 and each of the respective outer portions 72. The central portion 88 has a first intermediate portion surface 82 and a second intermediate portion surface 84. The central portion 88 defines a void 96 therein between the first intermediate portion surface 82 and the second intermediate portion surface 84. The void 96 has an outer void perimeter 98. The intermediate portion 74 may further include at least one extension portion 90 extending from at least one of the edges of the second set of edges 94.

The second assembly portion 18 further includes a bushing 48. The bushing 48 may be formed of a rubberized material. The rubberized material may be, more particularly, a vulcanized rubber material such as natural rubber, reclaimed rubber, or synthetic rubber, alone or in combination, that are intended for, but not limited to, use in rubber products for automotive applications. The rubberized material may be classified as an SAE J200 material.

The bushing 48 may be molded or fitted about the intermediate portion 74 of the second bracket 46, such that the bushing 48 is in contact with each of the first intermediate portion surface 82 and the second intermediate portion surface 84. The bushing 48 may have a first bushing surface 97 and a second bushing surface 95. The bushing 48 may further define an interior cavity 93 therein having an open end 91 and a closed end 89. The open end 91 has an exterior perimeter, which is defined by the first bushing surface 97. The interior cavity 93 extends into the bushing 48 from the open end 91 at the first bushing surface 97 to the closed end 89, such that the interior cavity 93 is positioned within the void 96 in the intermediate portion 74 of the second bracket 46.

Figure 6:
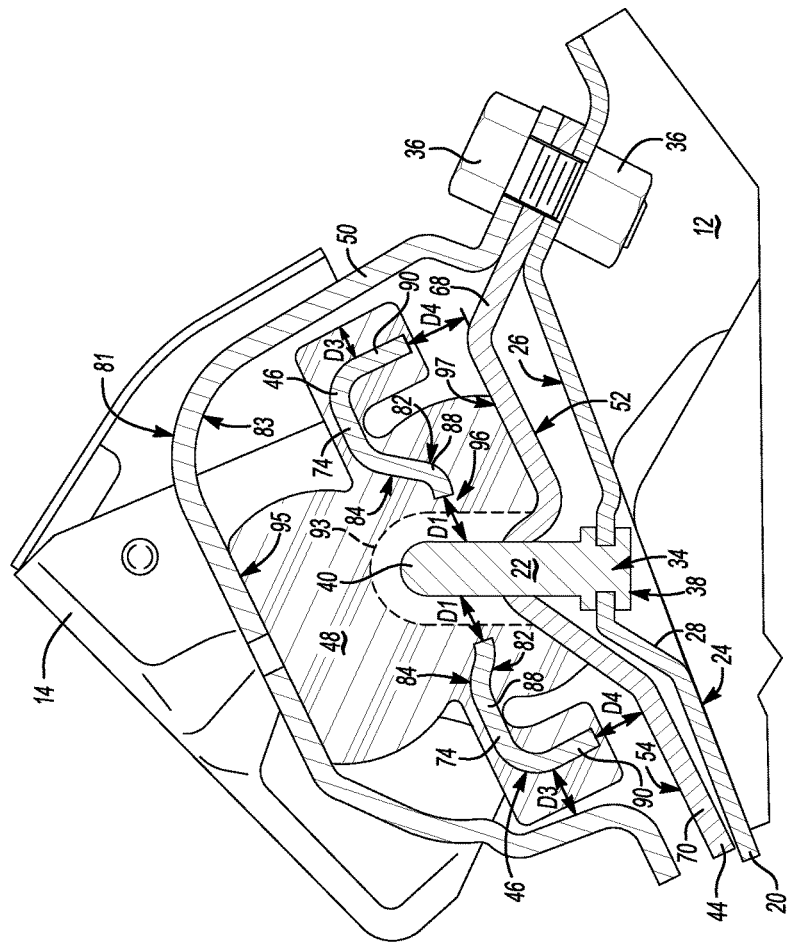
FIG. 6 is a second schematic, cross-section of the example mounting assembly taken along Section 6-6 shown in FIG. 4.
Figure 5:
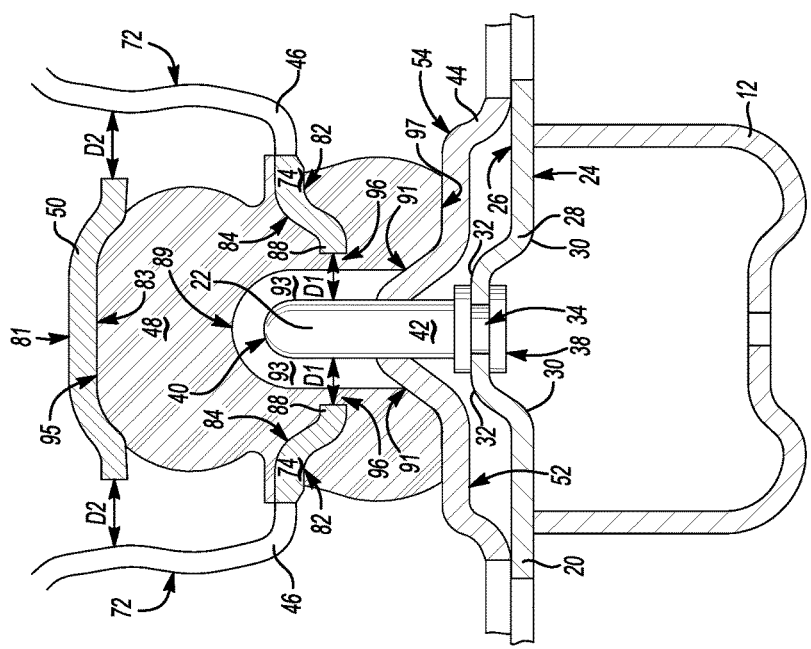
FIG. 5 is a first schematic, cross-section of the example mounting assembly taken along Section 5-5 shown in FIG. 4.

The bushing 48 is further disposed, such that the first bushing surface 97 is in contact with the base plate second surface 54. The interior cavity 93 is aligned with and configured to receive the base plate protrusion 56, such that the locating pin 22 is disposed within the protrusion bore 62 near its first end 38 and extends into the interior cavity 93 to its second end, when the first component 12 is coupled to the second component 14. Resultantly, as shown in FIGS. 5 and 6, the locating pin 22, when positioned inside the interior cavity 93 is also disposed within the void 96 near the locating pin second end 40.

The second assembly portion 18 further includes a bracket strap 50 configured to couple the base plate 44, the second bracket 46, and the bushing 48. The bracket strap 50 may have a first end 87 and a second end 85, a first strap surface 83, and a second strap surface 81. The bracket strap 50 is disposed between the outer portions 72 of the second bracket 46, such that the first strap surface 83 is in contact with the second bushing surface 95. The bracket strap 50 is configured to apply a compressive force on the first bushing surface 95 when secured to the base plate 44 at each of the first end 87 and second end 85 via the plurality of fasteners 36.

Referring to FIGS. 1-4, the mount assembly 10 is configured to couple the first component 12 and the second component 14 and position the second component 14 with respect to the first component 12. The mount assembly 10 has multiple practical applications. For example, during assembly of a vehicle or the like, wherein the first component 12 is a vehicle frame and the second component 14 is a vehicle powertrain, the mounting assembly 10 may, via the first assembly portion 16 and the second assembly portion 18, be utilized to position and align the second component 14 with the first component 12 during vehicle assembly.

Figure 4:
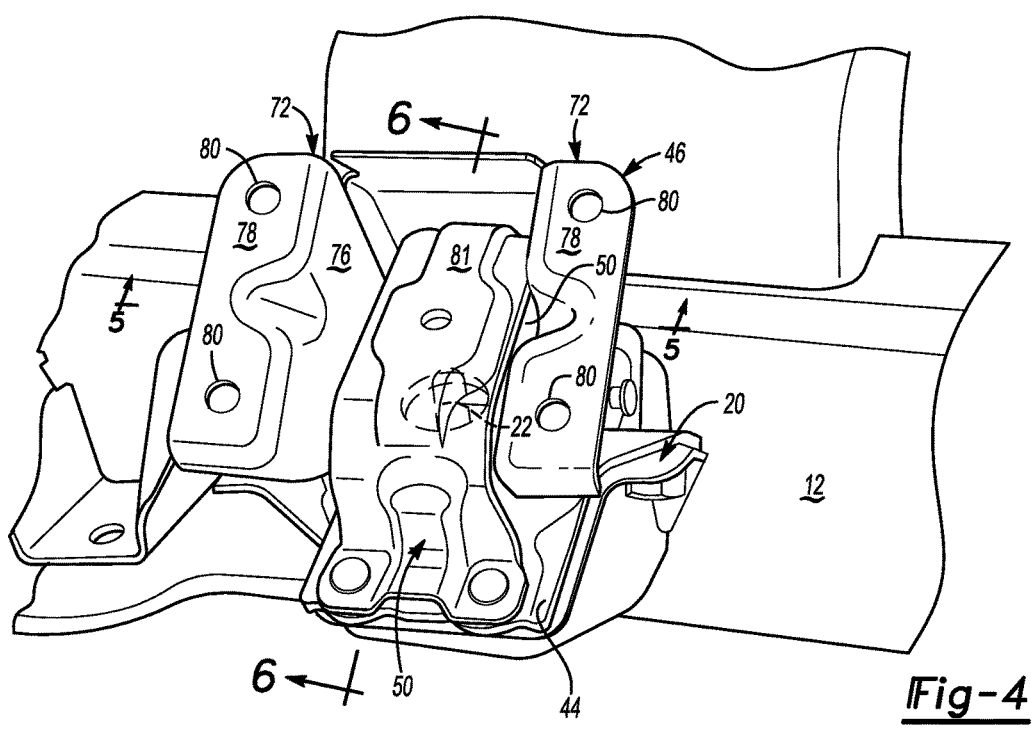
FIG. 4 is a schematic, perspective view of the example mounting assembly secured to a first component.

During assembly the first component 12 is coupled to the second component 14 via the coupling of the first assembly portion 16 and the second assembly portion 18. As best shown in FIGS. 3 and 4, the second assembly portion 18 is lowered down onto the first assembly portion 16. The locating pin 22 of the first assembly portion 16 in conjunction with the base plate protrusion portion 56 act to align and position the second assembly portion 18 with respect to the first assembly portion 16. As such, as the second assembly portion 18 is lowered onto the first assembly portion 16, the locating pin 22 enters the base plate protrusion portion 56 and extends through the protrusion bore 62 and subsequently enters the bushing interior cavity 93, such that the first end 38 is fixed within the first bracket bore 34 and the second end is disposed within the bushing interior cavity 93 and within the second bracket void 96 (FIGS. 5 and 6), and such that the first bracket protrusion 28 is fitted within the base plate protrusion 56 and the first bracket second surface 26 is in contact with the base plate first surface 52 (FIGS. 5 and 6).

The locating pin 22 guides the second assembly portion 18 onto the first assembly portion 18 and aligns the second assembly portion 18 for attachment to the first assembly portion 16 and the first component 12 with the plurality of fasteners 36.

When the first assembly portion 16 and the second assembly portion 18 are coupled and fixed together via the plurality of fasteners 36, the mount assembly 10 maintains additional practical benefits. For example, the mount assembly 10 may also be utilized as and incorporates additional bump stops between the first assembly portion 16 and the second assembly portion 18. In vehicular applications, under driving conditions the locating pin 22 remains fixed relative to the first component 12 and the second bracket 46 may move relative to the second component 14. Under loads the second bracket 46 may contact each of the base plate 44, the bracket strap 50, and the locating pin 22. As such, the mounting assembly 10 is designed, such that a minimum clearance between the second bracket 46 and each of the base plate 44, the bracket strap 50, and the locating pin 22 is maintained in static conditions and buffered by the bushing 48, to allow for relative motion under dynamic conditions.

As shown in FIGS. 5 and 6, when the first assembly portion 16 is coupled to the second assembly portion 18, the mounting assembly 10 is placed under dynamic conditions, the second bracket 46 may undergo translational and/or rotational motion and may contact each of the locating pin 22, the base plate second surface 54, and the bracket strap first surface 83. As such, under static conditions, the mounting assembly 10 is designed such that, the second bracket 46 is spaced apart from each of the locating pin exterior surface 42, the base plate second surface 54, and the bracket strap first surface 83 a predetermined minimum clearance distance.

The mounting assembly 10 as described herein and shown in FIGS. 5 and 6, wherein the void perimeter 98 is spaced apart a first distance D1 from the locating pin exterior surface 42, second bracket outer portions 72 are spaced apart a second distance D2 from the bracket strap 50, the second set of edges 94 of the central portion 88 of the intermediate portion 74 are spaced apart a third distance D3 from the bracket strap first surface 83, and the intermediate portion first surface 82 is spaced apart a fourth distance D4 from the base plate second surface 54, is configured to distribute the stress of high torque loads on the mounting assembly 10 evenly amongst the respective components. This allows the respective components to be formed at a decreased gauge thickness, which optimizes mass and packaging considerations and allows for the use of the mounting assembly across a wide variety of applications, in the vehicular context, a wide variety of vehicle makes and models.

The intermediate portion 74 of the second bracket 46 is spaced apart from the locating pin 22, such that the void perimeter 98 is spaced apart a first distance D1 from the locating pin exterior surface 42. The first distance D1 may range from about five (5) millimeters (mm) to about fifteen (15) millimeters (mm).

The second bracket 46 is spaced apart from the bracket strap 50, such that the second bracket outer portions 72 are spaced apart a second distance D2 from the bracket strap 50. The second distance D2 may range from about five (5) millimeters (mm) to about fifteen (15) millimeters (mm).

The second bracket 46 is spaced apart from the bracket strap 50, such that the second set of edges 94 of the central portion 88 of the intermediate portion 74 are spaced apart a third distance D3 from the bracket strap first surface 83. The third distance D3 may range from about five (5) millimeters (mm) to about fifteen (15) millimeters (mm).

The second bracket 46 is spaced apart from the base plate 44, such that intermediate portion first surface 82 is spaced apart a fourth distance D4 from the base plate second surface 54. The fourth distance D4 may be from about five (5) millimeters (mm) to about fifteen (15) millimeters (mm).

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A mounting assembly configured to couple a first component and a second component, the mounting assembly comprising:
    a first assembly portion coupled to the first component, the first assembly portion including:
        a first bracket secured to the first component, the first bracket having a first bracket first surface and a first bracket second surface, the first bracket defining a first bracket protrusion section that extends outwardly from the first bracket second surface, the first bracket protrusion section defining a first bracket bore therein; and
        a locating pin configured to position the second component with respect to the first component when the second component is coupled to the first component, the locating pin having a first end, a second end, and a locating pin exterior surface, wherein the first end is fixedly mounted within the first bracket bore;
    a second assembly portion coupled to the second component, the second assembly portion including a base plate having a base plate first surface and a base plate second surface, the base plate defining a base plate protrusion portion that defines a protrusion bore therein;
    wherein the locating pin is disposed within the protrusion bore when the second assembly portion is coupled to the first assembly portion, such that the first bracket protrusion is fitted within the base plate protrusion and the first bracket second surface is in contact with the base plate first surface; and
    wherein the first component is a vehicle frame and the second component is a vehicle powertrain.

2. The mounting assembly of claim 1 wherein the second assembly portion further includes a second bracket having a plurality of outer portions and an intermediate portion disposed between the outer portions, the intermediate portion having a first intermediate portion surface, a second intermediate portion surface, a first set of edges disposed between the respective outer portion and the intermediate portion and a second set of edges, the intermediate portion defining a void therein and the void having a void perimeter.

3. The mounting assembly of claim 2 wherein the second assembly portion further includes a bushing having a first bushing surface and a second bushing surface and defining an interior cavity, the interior cavity having an open end defined by the first bushing surface and a closed end, wherein the bushing is disposed about the intermediate portion of the second bracket and in contact with each of the first intermediate portion surface and the second intermediate portion surface.

4. The mounting assembly of claim 1 wherein the interior cavity is aligned with and disposed within the void in the intermediate portion of the second bracket, and wherein the interior cavity is configured to receive the locating pin, when the second assembly portion is coupled to the first assembly portion, such that the locating pin second end is positioned closer to the interior cavity closed end than the interior cavity open end and the first bushing surface is in contact with the base plate second surface.

5. The mounting assembly of claim 4 wherein the second assembly portion further includes a bracket strap, the bracket strap having a first end, a second end, a first strap surface, and a second strap surface, the bracket strap being disposed between the outer portions of the second bracket and fastened to the base plate at the first end and the second end, such that the first strap surface is in contact with the second bushing surface, and wherein the bracket strap is configured to couple the base plate, the second bracket, and the bushing and further configured to apply a compressive force on the second bushing surface.

6. The mounting assembly of claim 5 wherein the second bracket is spaced apart from each of the locating pin, the base plate, and the bracket strap.

7. The mounting assembly of claim 6 wherein the intermediate portion of the second bracket is spaced apart from the locating pin, such that the void perimeter is spaced apart a first distance from the locating pin exterior surface.

8. The mounting assembly of claim 7 wherein the first distance is from about 5 millimeters to about 15 millimeters.

9. The mounting assembly of claim 7 wherein the second bracket is spaced apart from the bracket strap, such that the second bracket outer portions are spaced apart a second distance from the bracket strap.

10. The mounting assembly of claim 9 wherein the second distance is from about from about 5 millimeters to about 15 millimeters.

11. The mounting assembly of claim 9 wherein the second bracket is spaced apart from the bracket strap, such that each of the edges of the second plurality of edges of the intermediate portion is spaced apart a third distance from the bracket strap first surface.

12. The mounting assembly of claim 11 wherein the third distance is from about from about 5 millimeters to about 15 millimeters.

13. The mounting assembly of claim 11 wherein the second bracket is spaced apart from the base plate, such that first intermediate portion surface is spaced apart a fourth distance from the second bracket second surface.

14. The mounting assembly of claim 13 wherein the fourth distance is from about from about 5 millimeters to about 15 millimeters.

15. A vehicle comprising:
a vehicle frame;
a vehicle powertrain; and
a mounting assembly configured to couple the vehicle frame and the vehicle powertrain, the mounting assembly comprising:
a first assembly portion coupled to the vehicle frame, the first assembly portion including:
a first bracket secured to the vehicle frame, the first bracket having a first bracket first surface and a first bracket second surface, the first bracket defining a first bracket protrusion section that extends outwardly from the first bracket second surface, the first bracket protrusion section defining a first bracket bore therein; and
a locating pin having a first end, a second end, and a locating pin exterior surface, wherein the first end is fixedly mounted within the first bracket bore;
a second assembly portion coupled to the second component, the second assembly portion including a base plate having a base plate first surface and a base plate second surface, the base plate defining a base plate protrusion portion that defines a protrusion bore therein; and
wherein the locating pin is configured to position the vehicle powertrain with respect to the vehicle frame during assembly, such that when the vehicle powertrain is coupled to the vehicle frame, the locating pin is disposed within the protrusion bore, such that the first bracket protrusion is fitted within the base plate protrusion and the first bracket second surface is in contact with the base plate first surface.

16. The vehicle of claim 15 wherein the second assembly portion further includes:
a second bracket having a plurality of outer portions and an intermediate portion disposed between the outer portions, the intermediate portion having a first intermediate portion surface, a second intermediate portion surface, a first set of edges disposed between the respective outer portions and the intermediate portion, and a second set of edges, the intermediate portion defining a void therein and the void having a void perimeter;
a bushing having a first bushing surface and a second bushing surface and defining an interior cavity, the interior cavity having an open end defined by the first bushing surface and a closed end, wherein the bushing is disposed about the intermediate portion of the second bracket and in contact with each of the first intermediate portion surface and the second intermediate portion surface;
a bracket strap having a first end, a second end, a first strap surface, and a second strap surface, the bracket strap being disposed between the outer portions of the second bracket, such that the first strap surface is in contact with the second bushing surface, and wherein the bracket strap is configured to couple the base plate, the second bracket, and the bushing and further configured to apply a compressive force on the second bushing surface.

17. The vehicle of claim 16 wherein the interior cavity is aligned with and disposed within the void in the intermediate portion of the second bracket, and wherein the interior cavity is configured to receive the locating pin, such that the locating pin second end is disposed closer to the interior cavity closed end than the interior cavity open end and the first bushing surface is in contact with the base plate second surface.

18. The vehicle of claim 17 wherein the second bracket is spaced apart from each of the locating pin, the base plate, and the bracket strap, such that:
the void perimeter is spaced apart a first distance from the locating pin exterior;
the outer portions are spaced apart a second distance from the bracket strap;
each of the second set of edge of the intermediate portion is spaced apart a third distance from the bracket strap first surface; and
the first intermediate portion surface is spaced apart a fourth distance from the second bracket second surface.

19. The mounting assembly of claim 18 wherein the first distance is from about 5 millimeters to about 15 millimeters, the second distance is from about 5 millimeters to about 15 millimeters, the third distance is from about 5 millimeters to about 15 millimeters, and the fourth distance is from about 5 millimeters to about 15 millimeters.

\* \* \* \* \*